US012662743B1

(12) United States Patent
Liu et al.

(10) Patent No.: US 12,662,743 B1
(45) Date of Patent: Jun. 23, 2026

(54) SODIUM HYPOCHLORITE GENERATOR

(71) Applicant: Guangzhou Rising Dragon Recreation Industrial Co., Ltd., Guangzhou (CN)

(72) Inventors: Xuewen Liu, Guangzhou (CN); Ziqin Guo, Guangzhou (CN); Qingquan Yu, Guangzhou (CN); Zhiyuan Yuan, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 966 days.

(21) Appl. No.: 17/900,874

(22) Filed: Sep. 1, 2022

(30) Foreign Application Priority Data

| Nov. 10, 2021 | (CN) | ............................ | 202111326212.5 |
| Nov. 10, 2021 | (CN) | ............................ | 202122741856.2 |
| Nov. 10, 2021 | (CN) | ............................ | 202122743832.0 |
| Nov. 10, 2021 | (CN) | ............................ | 202122743839.2 |

(51) Int. Cl.
| *H02J 50/00* | (2016.01) |
| *C25B 1/26* | (2006.01) |
| *H02J 50/12* | (2016.01) |

(52) U.S. Cl.
CPC .............. *C25B 1/26* (2013.01); *H02J 50/005* (2020.01); *H02J 50/12* (2016.02)

(58) Field of Classification Search
CPC ............ C25B 1/26; H02J 50/12; H02J 50/005
USPC ......................................................... 307/104
See application file for complete search history.

(56) References Cited

U.S. PATENT DOCUMENTS

| 2014/0266034 A1* | 9/2014 | Lee .......................... | H02J 50/40 |
| | | | 320/108 |
| 2015/0372495 A1* | 12/2015 | McCauley .............. | H02J 50/70 |
| | | | 307/104 |
| 2017/0203980 A1* | 7/2017 | Buzaglo .............. | C02F 1/46104 |
| 2021/0147255 A1* | 5/2021 | Burnham .............. | E04H 4/1209 |
| 2021/0399581 A1* | 12/2021 | Stingu ................... | F21V 23/003 |

* cited by examiner

*Primary Examiner* — Michael R. Fin
(74) *Attorney, Agent, or Firm* — Andrew C. Cheng

(57) ABSTRACT

A sodium hypochlorite generator comprises an electrode insert and a base. The electrode insert comprises an insert body and a preset number of electrodes installed on the insert body. A wireless power emitting device is disposed in the base. A wireless power receiving device is disposed in the insert body and is electrically connected to the electrodes. An external power supply drives the electrodes to perform electrolysis through the wireless power emitting device and the wireless power receiving device.

17 Claims, 12 Drawing Sheets

SODIUM HYPOCHLORITE GENERATOR

FIELD

The invention relates to the field of disinfection and sterilization of water in outdoor massage bathtubs, hot tub and swimming pools, in particular to a sodium hypochlorite generator.

BACKGROUND

In modern life, sodium hypochlorite prepared by electrolyzing a sodium chloride solution through an electrochemical technique is used to sterilize swimming pools, hot tub or bathtubs, disinfectants prepared through the electrochemical technique are generally electrolyzed-oxidizing water (EOW) which are non-toxic, environmentally friendly and good in disinfection and sterilization performance. When sodium hypochlorite is prepared through the electrochemical technique, a sodium hypochlorite generator is used. Due to the fact that the sodium hypochlorite generator is placed in water for a long time, it should have extremely high sealing and waterproofing performance. Moreover, the electrodes of the sodium hypochlorite generator, as consumables, cannot be used for a long time and need to be changed frequently, and it is difficult to change the electrodes underwater. In the prior art, the electrodes of the sodium hypochlorite generator used in swimming pools, hot tub or bathtubs are changed by dragging an electrode insert out of water through a long cable pre-buried in an interior space of the sodium hypochlorite generator. However, when the electrodes are changed in this way, a large interior space has to be reserved in the sodium hypochlorite generator in order to store the cable, which makes the sodium hypochlorite generator large in size and unaesthetic; and due to the extremely high waterproofing requirements for the sodium hypochlorite generator, the manufacturing cost is high, potential safety hazards may be caused, and it is quite inconvenient to change the electrodes. So, a novel sodium hypochlorite generator is needed.

SUMMARY

In view of the defects of large size, difficulty in change of vulnerable parts and extremely high waterproofing requirements of existing sodium hypochlorite generators, the invention provides a sodium hypochlorite generator based on wireless power transmission.

The present disclosure provides a sodium hypochlorite generator which comprises an electrode insert and a base. The electrode insert comprises an insert body and a predetermined number of electrodes installed on the insert body. A wireless power emitting device is disposed in the base, a wireless power receiving device is disposed in the insert body and is electrically connected to the electrodes so that an external power supply is capable of driving the electrodes to perform electrolysis through the wireless power emitting device and the wireless power receiving device.

In some embodiments, the wireless power emitting device comprises an emitting coil, the wireless power receiving device comprises a receiving coil, the emitting coil is symmetrical with the receiving coil, and the wireless power emitting device and the wireless power receiving device perform wireless power transmission through electromagnetic induction.

In some embodiments, the wireless power emitting device and the wireless power receiving device each comprise a resonator, the resonator of the wireless power emitting device is configured to emit a diffuse field electromagnetic wave, and the resonator of the wireless power receiving device is configured to receive electric energy wirelessly at a frequency matching the diffuse field electromagnetic wave.

In some embodiments, the wireless power emitting device comprises an emitting coil, the wireless power receiving device comprises a receiving coil, the emitting coil is configured to vibrate at a predetermined frequency to output a non-radiating magnetic field, the receiving coil has at a natural frequency which is the same as the predetermined frequency of the emitting coil so that the receiving coil can receive energy from the non-radiating magnetic field, and the wireless power emitting device and the wireless power receiving device perform wireless power transmission through electromagnetic coupling resonance.

In some embodiments, the wireless power emitting device comprises an electromagnetic wave generator, the wireless power receiving device comprises a receiving antenna, and the wireless power emitting device and the wireless power receiving device perform wireless power transmission through radio waves.

In some embodiments, the wireless power receiving device further comprises a rectification filter module, and the wireless power receiving device is configured to wirelessly receive electric energy from the wireless power emitting device to form AC electric energy, and the rectification filter module is configured to convert the AC electric energy into DC electric energy and output the DC electric energy to the electrodes.

In some embodiments, the wireless power receiving device further comprises a polarity reversal circuit and a polarity reversal controller which are connected electrically, two inputs of the polarity reversal circuit are electrically connected to two outputs of the polarity reversal controller respectively, two outputs of the polarity reversal circuit are electrically connected to the electrodes respectively, and the two outputs of the polarity reversal controller are switched regularly to output a high level and a low level respectively to make the polarity reversal circuit to switch polarities of the two outputs regularly, so as to realize regular polarity reversal of the electrodes.

In some embodiments, the polarity reversal circuit comprises a first triode, a second triode, a first MOS transistor, a second MOS transistor, a third MOS transistor and a fourth MOS transistor, the first triode is electrically connected to the third MOS transistor and the fourth MOS transistor, the second triode is electrically connected to the first MOS transistor and the second MOS transistor, and the polarity reversal circuit together with the polarity reversal controller sequentially through a current sampling circuit and a constant-current control circuit forms a closed circuit.

In some embodiments, the wireless power receiving module further comprises a DCDC voltage stabilizing module electrically connected to the rectification filter module and the electrodes, and the DCDC voltage stabilizing module is configured to increase or decrease a DC voltage output by the rectification filter module to form a constant voltage, which is then output to the electrodes.

In some embodiments, the wireless power receiving module further comprises a constant current module electrically connected to the rectification filter module and the DCDC voltage stabilizing module, the constant current module cooperates with a sampling circuit to output a variable voltage to the DCDC voltage stabilizing module through an operational amplifier, and the variable voltage changes an output voltage of the DCDC stabilizing module to keep a current received by the electrode constant.

In some embodiments, the sodium hypochlorite generator further comprising a cover, wherein the base is configured to be fixedly installed in a pre-buried wall hole, the electrode insert is detachably inserted into an insert accommodating cavity of the base, the electrodes are communicated with an outside through voids defined through the cover, the wireless power emitting device is disposed outside the base and is close to the insert accommodating cavity, and the wireless power receiving device corresponding to the wireless power emitting device is disposed in the insert body.

In some embodiments, a cylinder extends from an end, close to the base, of the insert body, the wireless power receiving device is accommodated in an interior cavity of the cylinder, installation grooves for installing the electrodes are formed in an opposite end, away from the base, of the insert body, two protrusions are disposed outside the cylinder of the insert body, spiral grooves are formed in the insert accommodating cavity of the base, a clamping portion is disposed at an end of each of the spiral grooves, and the insert body is inserted into the base through cooperation of the protrusions and the spiral grooves and is fixed through cooperation of the protrusions and the clamping portions.

In some embodiments, wherein a cylinder extends from an end, close to the base, of the insert body, the wireless power receiving device is accommodated in an interior cavity of the cylinder, installation grooves for installing the electrodes are formed in an opposite end, away from the base, of the insert body, an external thread is disposed outside the cylinder of the insert body, an internal thread is disposed in the insert accommodating cavity of the base, and the insert body is fixedly installed in the base through threaded connection.

In some embodiments, an installation slot is formed in the interior cavity of the cylinder, the wireless power receiving device comprises a device body and an elastic lug provided on the device body, and the wireless power receiving device is slidably installed in the interior cavity of the cylinder through the elastic lug being slidably received in the installation slot.

In some embodiments, the sodium hypochlorite generator further comprising a turbulent flow passage which penetrates through the base and the insert body to be communicated with a working space of the electrodes.

In some embodiments, a flange extends from the electrode insert towards the cover, a threaded hole is defined in the flange, and the cover is fixedly installed on the insert body with a screw.

In some embodiments, a flange extends from the insert body towards the cover, an external thread is disposed on the flange, an internal thread is disposed in the cover, and the cover is fixedly installed on the insert body through a threaded connection.

In some embodiments, a flange extends from the base towards the cover, an external thread is disposed on the flange, an internal thread is disposed in the cover, and the cover is fixedly installed on the base through a threaded connection.

In some embodiments, an external thread is disposed on the base, and the base is fixedly installed in the pre-buried wall hole through a locking nut.

In some embodiments, an emitting device accommodating cavity extends from a side, opposite to the insert accommodating cavity, of the base, an installation slot is formed in the emitting device accommodating cavity, the wireless power emitting device comprises a device body and an elastic lug installed on the device body, and the wireless power emitting device is slidably installed in the emitting device accommodating cavity through the elastic lug being slidably received in the installation slot.

The sodium hypochlorite generator provided by the invention has the following beneficial effects:

According to the sodium hypochlorite generator, the wireless power emitting device installed in the base and the wireless power receiving device installed in the insert body are used to wirelessly supply power to the electrodes so as to drive the electrodes, so the electrode insert can be electrically connected to an external power supply without a wire penetrating through the base, and a position for pre-storing the wire does not need to be reserved in the insert accommodating cavity of the base anymore, thus reducing the size of the sodium hypochlorite generator, and the sealing performance of the base is improved by eliminating a wire hole. Moreover, the electrode insert is detachably installed on the base and does not need to be fixedly connected to the base anymore due to using of wireless power receiving means, so that the in disassembly flexibility of the electrode insert is greatly improved; and the airtightness of a joint of the power receiving device and the power supply is not an issue anymore, so that the sodium hypochlorite generator based on wireless power transmission is more flexible to use, and the production design cost and maintenance cost are reduced.

DESCRIPTION OF THE EMBODIMENTS

A sodium hypochlorite generator provided by the invention will be further described below in conjunction with the accompanying drawings. It should be noted that the technical solution and design principle of the invention will be expounded in detail below with reference to an optimal technical solution.

It should be noted that, in the whole description of the invention, directional terms such as "center", "crosswise", "lengthwise", "lateral direction", "length", "width", "thickness", "upper", "lower", "front", "back", "left", "right", "vertical", "perpendicular", "horizontal", "top", "bottom", "internal", "external", "clockwise", "anticlockwise" are used to indicate directional or positional relationships based on the accompanying drawings, or directional or positional relationships commonly expressed by those skilled in the art merely for the purpose of facilitating and simplifying the description of the invention, do not indicate or imply that devices or elements referred to must be in a specific direction or be configured and operated in a specific direction, and thus should not be construed as limitations of the specific protection scope of the invention.

Figure 1:
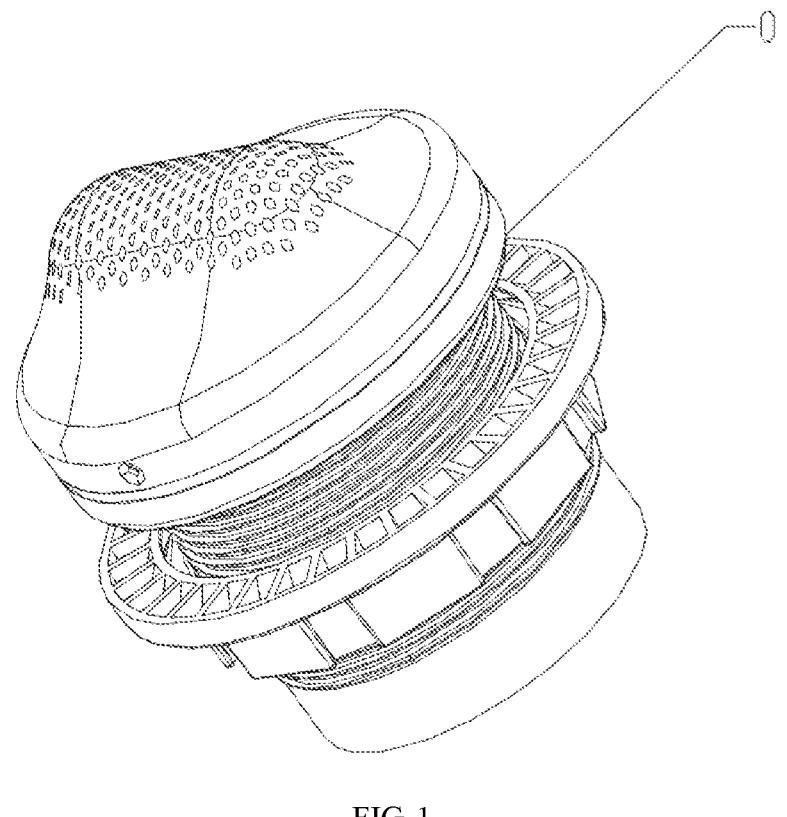
FIG. 1 illustrates a sodium hypochlorite generator provided by the invention.
Figure 2:
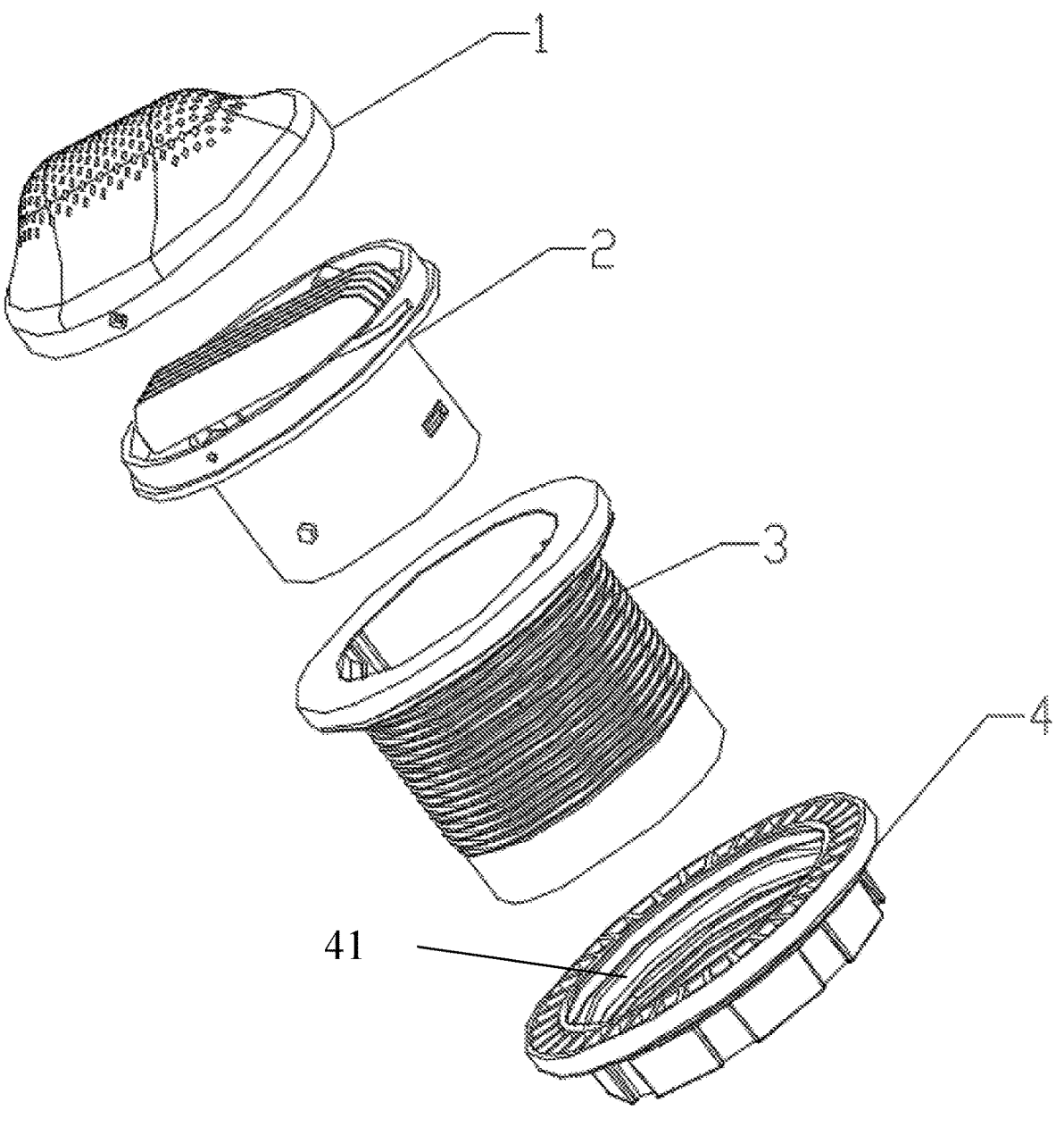
FIG. 2 is a modular disassembled view of the sodium hypochlorite generator in FIG. 1.
Figure 7:
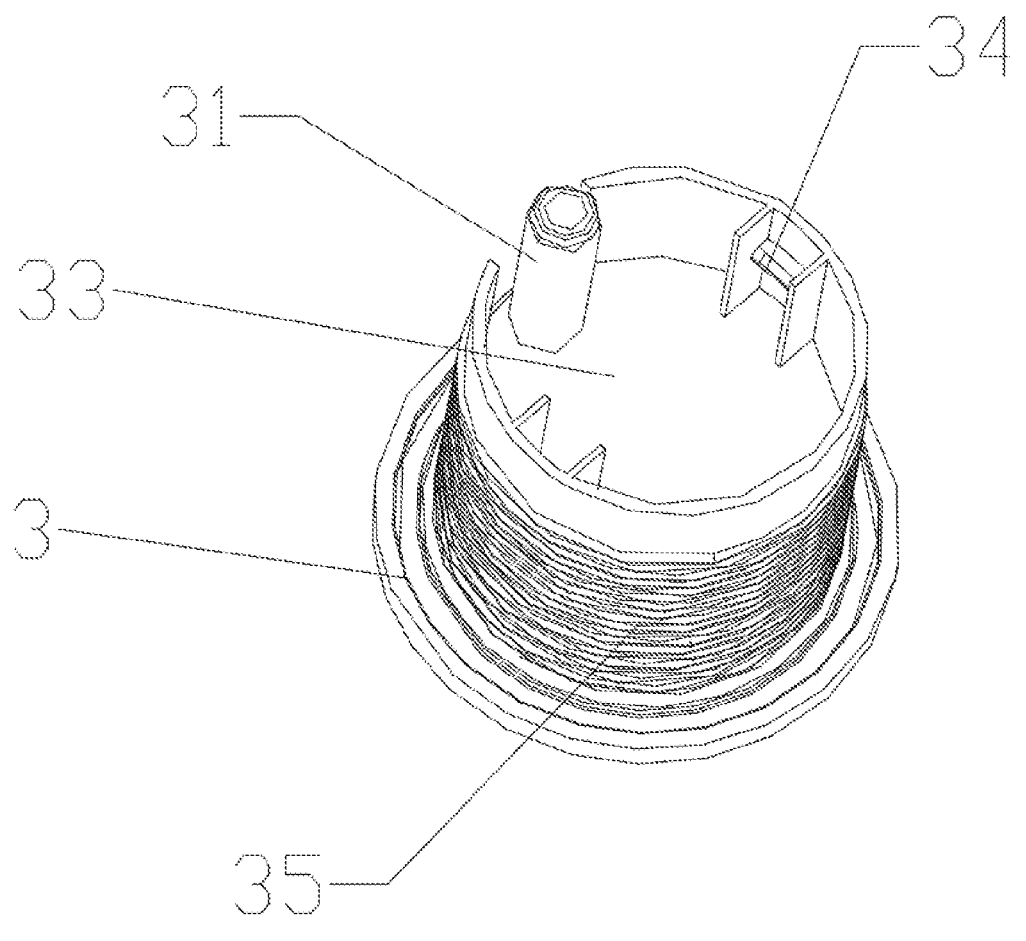
FIG. 7 is a bottom view of the base shown in FIG. 5.

First, referring to FIG. 1, FIG. 2 and FIG. 7 which illustrate a sodium hypochlorite generator 0 according to an embodiment of the present disclosure. The sodium hypochlorite generator 0 is used for sterilization of a swimming pool, hot tub or a bathtub. In this embodiment, the sodium hypochlorite generator 0 is fixed to a wall of the swimming pool, hot tub or the bathtub through the cooperation of a locking nut 4 and an external thread 35 on a base 3 which is inserted into a pre-buried hole reserved in the wall of the swimming pool, hot tub or the bathtub. Clearly, the installation manner based on the cooperation of the locking nut and the external thread illustrated in the invention is merely one of multiple manners in which the sodium hypochlorite generator is installed in the hole of the wall of the swimming pool, hot tub or the bathtub, and the sodium hypochlorite generator may also be installed in the hole of the wall of the swimming pool, hot tub or the bathtub in other manners such as through buckles or screws, which will no longer be detailed here. In addition, the sodium hypochlorite generator 0 may also be installed at the bottom of the bathtub, hot tub or the swimming pool, or be installed in or near the end of a water inlet pipe, as long as the sodium hypochlorite generator 0 is immersed in water in the bathtub, hot tub or the swimming pool.

Specifically, referring to FIG. 1, FIG. 2, FIG. 3 and FIG. 5, the sodium hypochlorite generator 0 provided by the invention specifically comprises a cover 1, an electrode insert 2 and a base 3, wherein the electrode insert 2 is detachably inserted into an insert accommodating cavity 32 of the base 3 and comprises an insert body 22 and a preset number of electrodes 21 installed on the insert body 22. A plurality of water holes 12 are formed in the cover 1, and the electrodes 21 are communicated with the outside through the cover 1, that is, the electrodes 21 are exposed to water in the bathtub, hot tub or the swimming pool. The cover 1 may be an individual cover, or be a grid or screen that covers the electrodes 21 to ensure sufficient contact of the electrodes 21 and water and protect and isolate the electrodes 21 to some extent, so that potential safety hazards and damage to the electrodes caused by direct contact of humans and the electrodes in use are prevented. A wireless power emitting device 6 is disposed outside the base 3 and is close to the insert accommodating cavity, a wireless power receiving device 5 is disposed in the insert body 22 and corresponds to the wireless power emitting device 6. The wireless power receiving device 5 is electrically connected to the electrodes 21, and an external power supply drives the electrodes 21 to perform electrolysis through the wireless power emitting device 6 and the wireless power receiving device 5. In addition, the number of the electrodes 21 is related to the power of wireless transmission and is not limited in principle. In this specific embodiment of the invention, the number of the electrodes 21 is five, and the polarities of the five electrodes 21 are "positive", "negative", "positive", "negative" and "positive" or "negative", "positive", "negative", "positive" and "negative". The number and polarities of the electrodes 21 may be set as needed, and will no longer be detailed here.

Preferably, the base 3 is fixedly installed on a wall of the bathtub, hot tub or the swimming pool or at a proper position of the bottom of the bathtub, hot tub or the swimming pool, a power line is fixedly connected to the base 3 and continuously supplies power to the wireless power emitting device 6 installed in the base 3, and in this case, the electrode insert 2 may be fixedly installed on the base 3 or in close contact with the base 3. With the development of the wireless power transmission technique, wireless power transmission may be realized as long as the electrode insert 2 and the base 3 are within a certain distance, so the connection relationship between the electrode insert 2 and the base 3 is not limited in the invention. The electrode insert 2 may be partially inserted into the base 3 like in this embodiment, or the electrode insert 2 and the base 3 are designed to be in other matching shapes. Next, different embodiments will be specifically introduced according to different wireless power transmission manners:

In a first embodiment of the invention, an emitting coil and a drive circuit are disposed in the wireless power emitting device 6, a receiving coil is disposed in the wireless power receiving device 5, and the emitting coil is symmetrical with the receiving coil. Through the coils, the wireless power emitting device and the wireless power receiving device can realize wireless power transmission through electromagnetic induction.

In a second embodiment of the invention, the wireless power emitting device 6 and the wireless power receiving device 5 each comprise a resonator. The resonator of the wireless power emitting device 6 emits a diffuse field electromagnetic wave, and the resonator of the wireless power receiving device 5 receives power wirelessly at a frequency matching the diffuse field electromagnetic wave. Through this power transmission method, electromagnetic waves emitted by a resonant circuit of the wireless power emitting device are diffused in a whole space in all directions in open, and a circuit of the wireless power receiving device resonates at this specific frequency to realize energy transmission.

In a third embodiment of the invention, the wireless power emitting device 6 comprises an emitting coil, the wireless power receiving device 5 comprises a receiving coil, the emitting coil vibrates at a predetermined frequency to output a non-radiating magnetic field, the receiving coil has at a natural frequency which is the same as the predetermined frequency of the emitting coil so that the receiving coil can receive energy from the non-radiating magnetic field. The wireless power emitting device 6 and the wireless power receiving device 5 realize wireless power transmission therebetween through electromagnetic coupling resonance.

In a fourth embodiment of the invention, the wireless power emitting device 6 comprises an electromagnetic wave generator, the wireless power emitting device 5 comprises a receiving antenna, and the wireless power emitting device 6 and the wireless power receiving device 5 realize wireless power transmission through radio waves.

The four embodiments illustrated above are for the purpose of realizing wireless power transmission, and other available wireless power transmission methods will no longer be detailed one by one here. Further, due to the properties of wireless power transmission, electric energy received by the wireless power receiving device is AC electric energy. Because of the alternate frequency of the AC electric energy, the polarities of the electrodes have to be switched frequently if the AC electric energy is directly used to drive the electrodes to work, so a rectifying circuit is disposed in the wireless power receiving device 5 to convert the AC electric energy into DC electric energy to drive the electrodes to work, so as to keep the polarities of the electrodes constant. In addition, due to the fact that the wastage of positive electrodes is different from the wastage of negative electrodes during the electrolysis process, a polarity reversal circuit and a polarity reversal controller for driving the polarity reversal circuit to work may be disposed in the wireless power receiving device 5 to switch the polarities of the electrodes regularly. To realize polarity reversal, two inputs of the polarity reversal circuit are electrically connected to two outputs of the polarity reversal controller respectively, two outputs of the polarity reversal circuit are electrically connected to the electrodes respectively, and the two outputs of the polarity reversal controller are switched regularly to output a high level and a low level respectively to make the polarity reversal circuit switch the polarities of the two outputs regularly, so as to reverse the polarities of the electrodes regularly, so that the service life of the electrodes is prolonged. In this embodiment, the electrodes are titanium electrodes, or electrodes made of other electrode materials.

Figure 8:
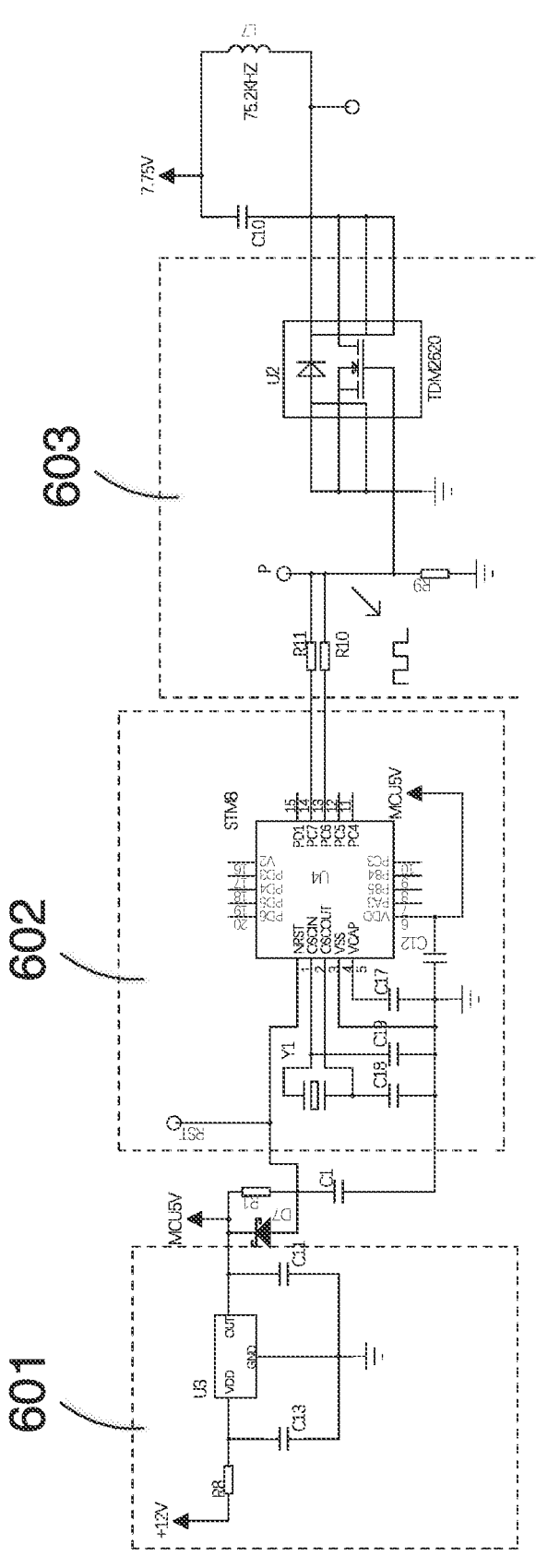
FIG. 8 is a circuit diagram of an electric energy emitting device of the sodium hypochlorite generator provided by the invention.
Figure 9:
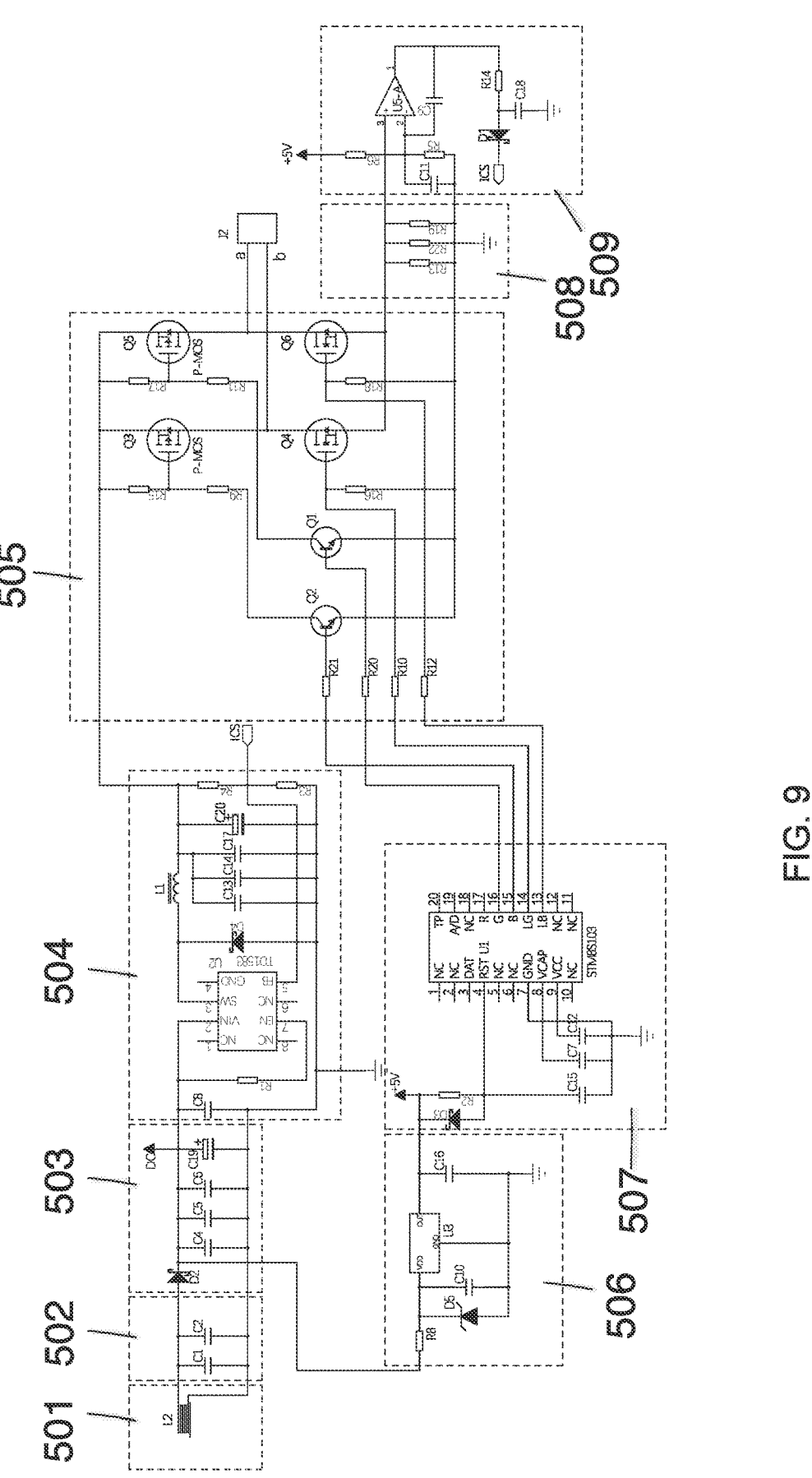
FIG. 9 is a circuit diagram of an electric energy receiving device of the sodium hypochlorite generator provided by the invention.

Specifically, referring to FIG. 8 and FIG. 9 which illustrate a specific circuit for driving the electrodes to work to implement wireless power transmission, wherein FIG. 8 illustrates a specific circuit diagram of the wireless power emitting device, and FIG. 9 illustrates a specific circuit diagram of the wireless power receiving device:

In detail, the wireless power emitting device 6 comprises a power supply module 601 electrically connected to the external power supply, a waveform output module 602, an amplification module 603 and an LC oscillation circuit connected to an output of the amplification module 603. The LC oscillation circuit comprises an emitting coil L7 and a matching capacitor C10. The power supply module 601 comprises a processor U3, and an external circuit electrically connected to the processor U3 and composed of a resistor R8, a capacitor C13 and a capacitor C11. The waveform output module 602 comprises a single-chip microcomputer U4, and an external circuit electrically connected to the single-chip microcomputer U4 and composed of a crystal oscillator Y1, a capacitor C17, a capacitor C18, a capacitor C19 and a capacitor C12, wherein the single-chip microcomputer U4 is specifically STM8, and the waveform output module 602 is electrically connected to the power supply module 601 through a resistor R1 and a diode D7. The power amplification module 603 comprises a processor U2, and an external circuit electrically connected to the processor U2 and composed of a resistor R9, a resistor R10 and a resistor R11. In this embodiment, an electric field output frequency of the wireless power emitting device 6 is 75.2 KHZ.

In detail, the wireless power receiving device 5 comprises a receiving module 501, a matching capacitor module 502, a rectification filter module 503, a DCDC constant-voltage constant-current module 504, a polarity reversal circuit module 505, a controller power supply module 506, a polarity reversal control module 507, a current sampling module 508 and a constant-current control module 509, wherein the receiving module 501 comprises a receiving coil L2, the matching capacitor module 502 comprises a capacitor C1 and a capacitor C2 which are connected in parallel, the rectification filter module 503 comprises a diode D2, a capacitor C4, a capacitor C5, a capacitor C6 and a capacitor C19 which are electrically connected in sequence. The DCDC constant-voltage constant-current module 504 comprises a processor U2, and an external circuit electrically connected to the processor U2 and composed of a resistor R1, a capacitor C8, a diode D4, a capacitor C13, a capacitor C14, a capacitor C17, a capacitor C20, a resistor R3 and a resistor R4. The controller power supply module 506 comprises a chip U3, and an external circuit electrically connected to the chip U3 and composed of a resistor R8, a diode D5, a capacitor C10 and a capacitor C16. The polarity reversal control module 507 comprises a single-chip microcomputer U1, and an external circuit electrically connected to the single-chip microcomputer U1 and composed of a resistor R2, a diode D3, a capacitor C15, a capacitor C7 and a capacitor C12. The polarity reversal circuit module 505 comprises a triode Q1, a triode Q2, an MOS transistor Q3, an MOS transistor Q4, an MOS transistor Q5, an MOS transistor Q6, a resistor R10, a resistor R12, a resistor R20, a resistor R21, a resistor R16 and a resistor R18. The current sampling module 508 comprises a resistor R13, a resistor R22 and a resistor R19. The constant-current control module 509 comprises an amplifier U5, and a resistor R5, a resistor R6, a capacitor C11, a capacitor C9, a resistor R14, a capacitor C18 and a diode D1 which are electrically connected to the amplifier U5. The receiving coil L2 converts electromagnetic energy emitted by the wireless power emitting module 6 into high-frequency AC electric energy together with the capacitor C1 and the capacitor C2, then the high-frequency AC electric energy is converted into DC electric energy by the rectification filter module 503, one path of the DC electric energy, after being stabilized, supplies low-voltage power to the polarity reversal controller module 507 and the constant-current control module 509 via the controller power supply module 506, and the other path of the DC electric energy is output through the DCDC constant-voltage constant-current module 504. The DCDC constant-voltage constant-current module 504 is arranged for maintaining the utilization efficiency of electric energy; due to the fact that, when the concentration of salt in water is low, the voltage and power of the circuit system will be increased in a constant-current state, which makes the generation efficiency of sodium hypochlorite low, so the maximum output voltage needs to be limited, and that, when the concentration of salt in water is high, the electrical conductivity of water is high, which will increase the current in case of constant-voltage power supply, thus shortening the service life of the electrodes, so the DCDC constant-voltage constant-current module 504 is used to limit voltage and current output. The triode Q1, the triode Q2, the MOS transistor Q4 and the MOS transistor Q6 in the polarity reversal circuit module 505 are connected to output ports G, B, LG and LB of the single-chip microcomputer U1 respectively. When the output ports G, B, LG and LB of the single-chip microcomputer U1 output a high level, a low level, a low level and a high level respectively, the MOS transistor Q3 and the MOS transistor Q6 are turned on, the MOS transistor Q4 and the MOS transistor Q5 are turned off, and in this case, an output a of a terminal J2 connected to the electrodes is a negative terminal, and an output b of the terminal J2 is a positive terminal; when the output ports G, B, LG and LB of the single-chip microcomputer U1 output a low level, a high level, a high level and a low level respectively, the MOS transistor Q4 and the MOS transistor Q5 are turned on, the MOS transistor Q3 and the MOS transistor Q6 are turned off, and in this case, the output a of the terminal J2 connected to the electrodes is a positive terminal, and the output b of the terminal J2 is a negative terminal. The single-chip microcomputer U1 outputs high and low levels repeatedly via the output ports G, B, LG and LB every preset time through a counter so as to realize polarity reversal of the electrodes. The constant-current control module 509 compares a sampling result of the current sampling module 508 with a preset value; when the sampling result of the current sampling module 508 is lower than the pre-set value, no voltage is output; when the sampling result of the current sampling module 508 is higher than the pre-set value, a voltage is output to control the DCDC constant-voltage constant-current module 504 to decrease the output voltage, so that the purpose of constant current is realized.

Figure 3:
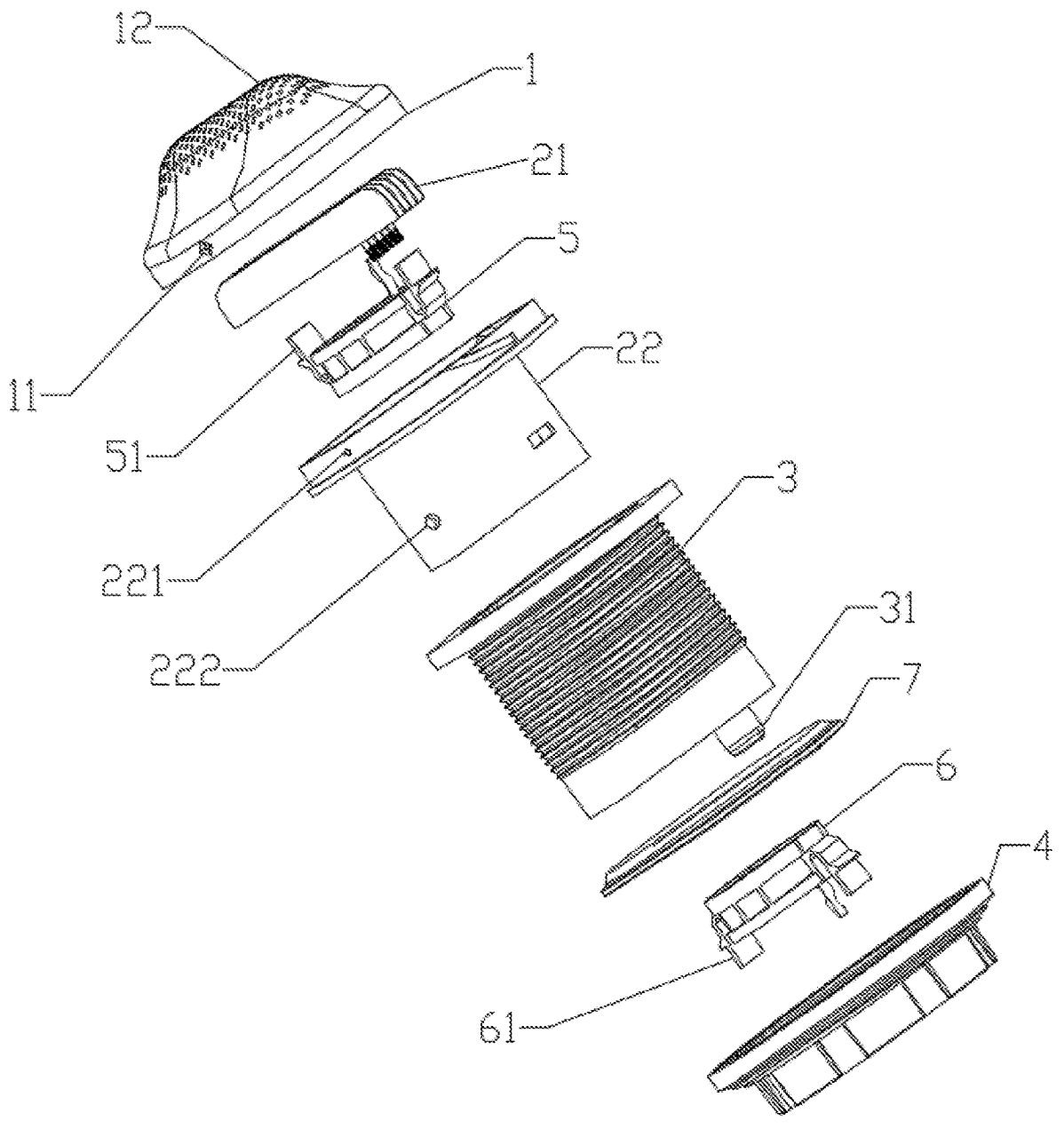
FIG. 3 is an exploded view of the sodium hypochlorite generator in FIG. 1.
Figure 4:
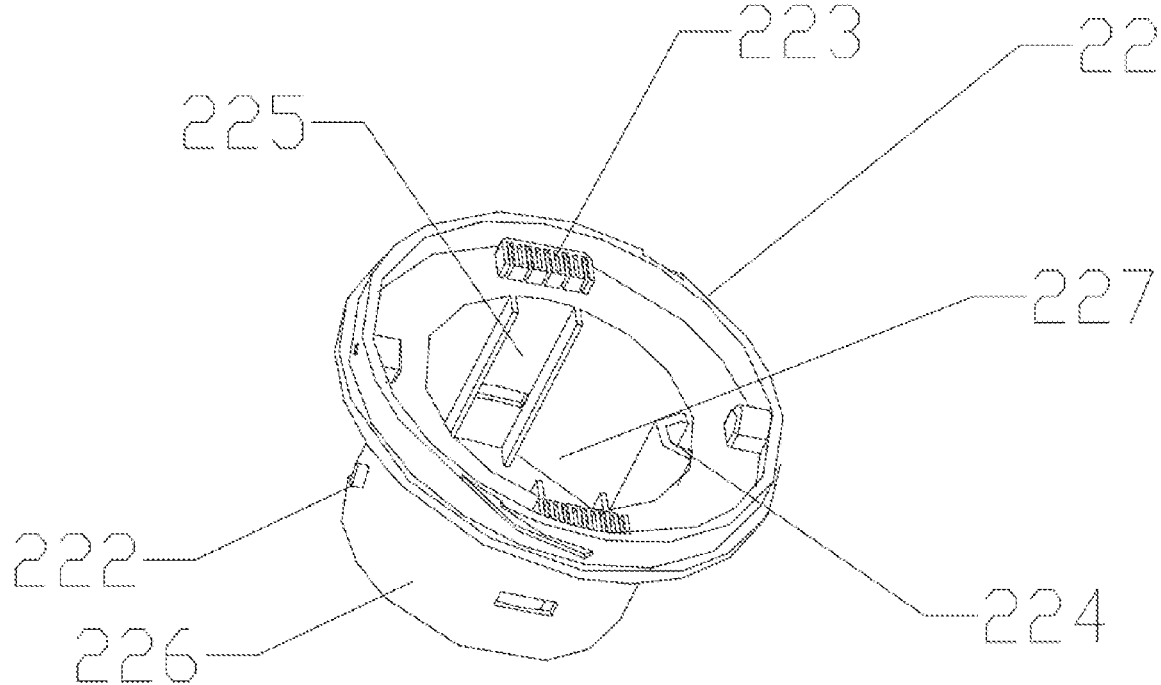
FIG. 4 illustrates an insert body of the sodium hypochlorite generator shown in FIG. 3.
Figure 5:
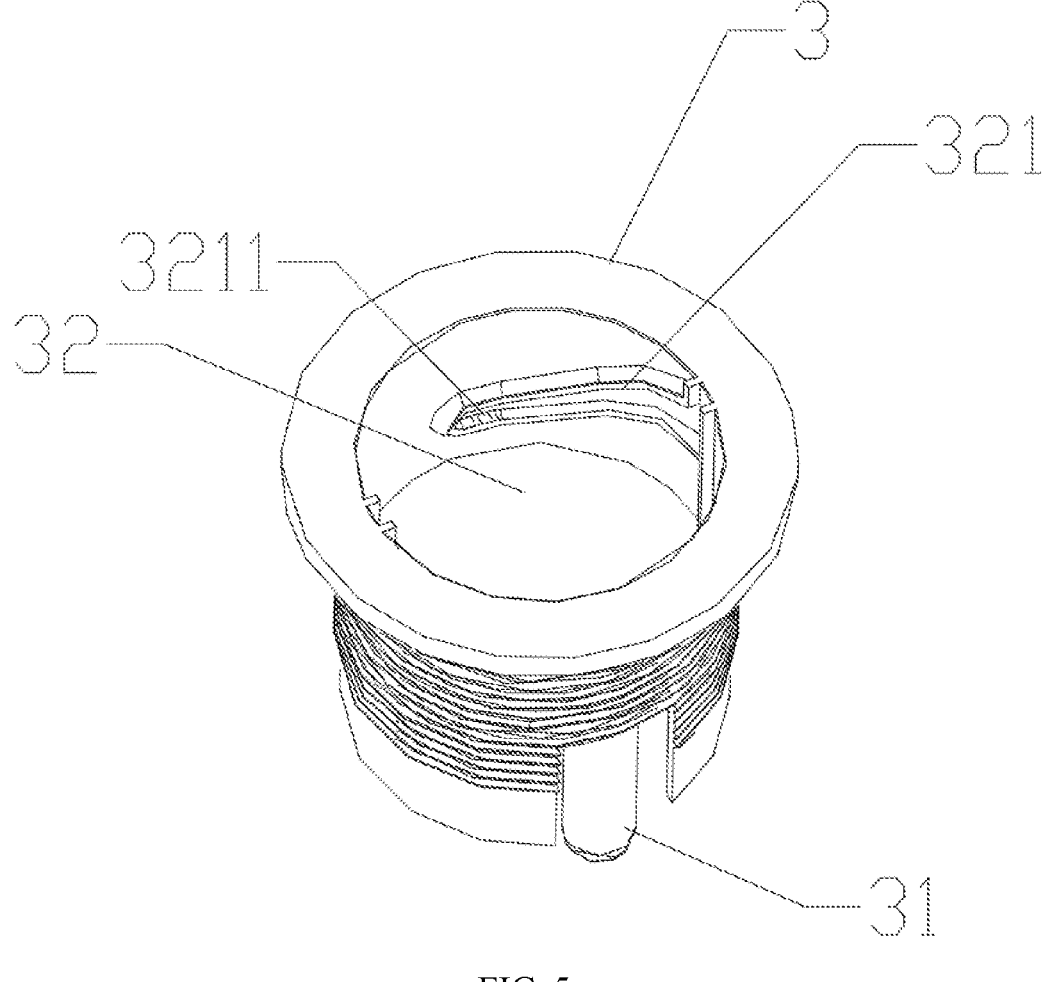
FIG. 5 illustrates a base of the sodium hypochlorite generator shown in FIG. 3.

Next, other mechanical structures of the specific embodiment of the sodium hypochlorite generator provided by the invention will be introduced:

Specifically, referring to FIG. 3, FIG. 4 and FIG. 5, the installation relationship of the insert body 22 and the base 3 in this embodiment will be introduced: the insert body 22 comprises a cylinder 226 extending from an end thereof close to the base 3, an interior cavity 227 of the cylinder 226 is configured to accommodate the wireless power receiving device 5. Installation grooves 223 for installing the electrodes 21 are formed in an end, away from the base 3, of the insert body 22. Two protrusions 222 are disposed outside the cylinder 226 of the insert body 22, spiral grooves 321 are formed in the insert accommodating cavity 32 of the base 3, a clamping portion 3211 is disposed at an end point of each of the spiral grooves 321, and the insert body 22 is inserted into the base 3 through cooperation of the protrusions 222 and the spiral grooves 321 and is fixed through cooperation of the protrusions 222 and the clamping portions 3211.

In addition, the invention further provides another installation relationship of the insert body 22 and the base 3, which is specifically as follows: referring to FIG. 3A, an external thread 202 is disposed outside the cylinder of the insert body 22, an internal thread 301 is disposed in the insert accommodating cavity of the base 3, and the insert body 22 is fixedly installed in the base 3 through a threaded connection.

Figure 6:
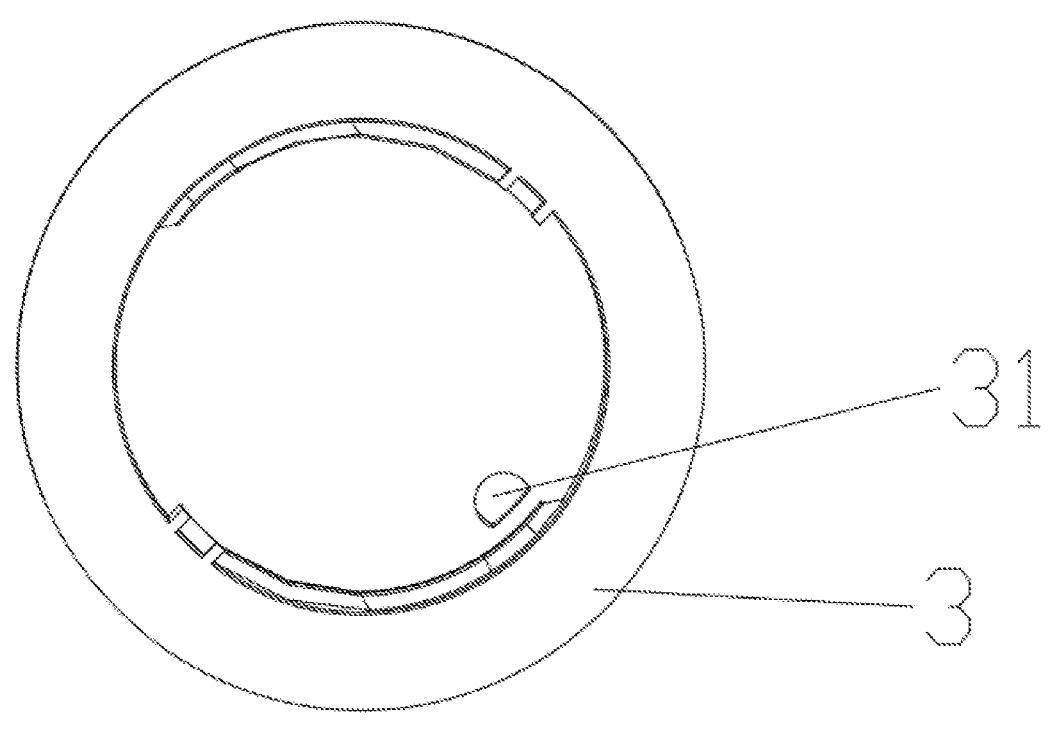
FIG. 6 is a top view of the base shown in FIG. 5.

Preferably, the sodium hypochlorite generator 0 further comprises a turbulent flow passage. Specifically, referring to FIG. 4, FIG. 5 and FIG. 6, the turbulent flow passage comprises a first passage 31 formed in the base 3 and a second passage 224 formed in the insert body 22, and the first passage 21 is communicated with the second passage 224. The turbulent flow passage is communicated with an external water source in order to supply a turbulent water flow into a working space of the electrodes for the purpose of dispersing sodium hypochlorite in the working space of the electrodes to fulfil a better sterilization effect and preventing an excessively high local concentration of the sodium hypochlorite, which may otherwise cause corrosion of the sodium hypochlorite generator 0.

Figure 2A:
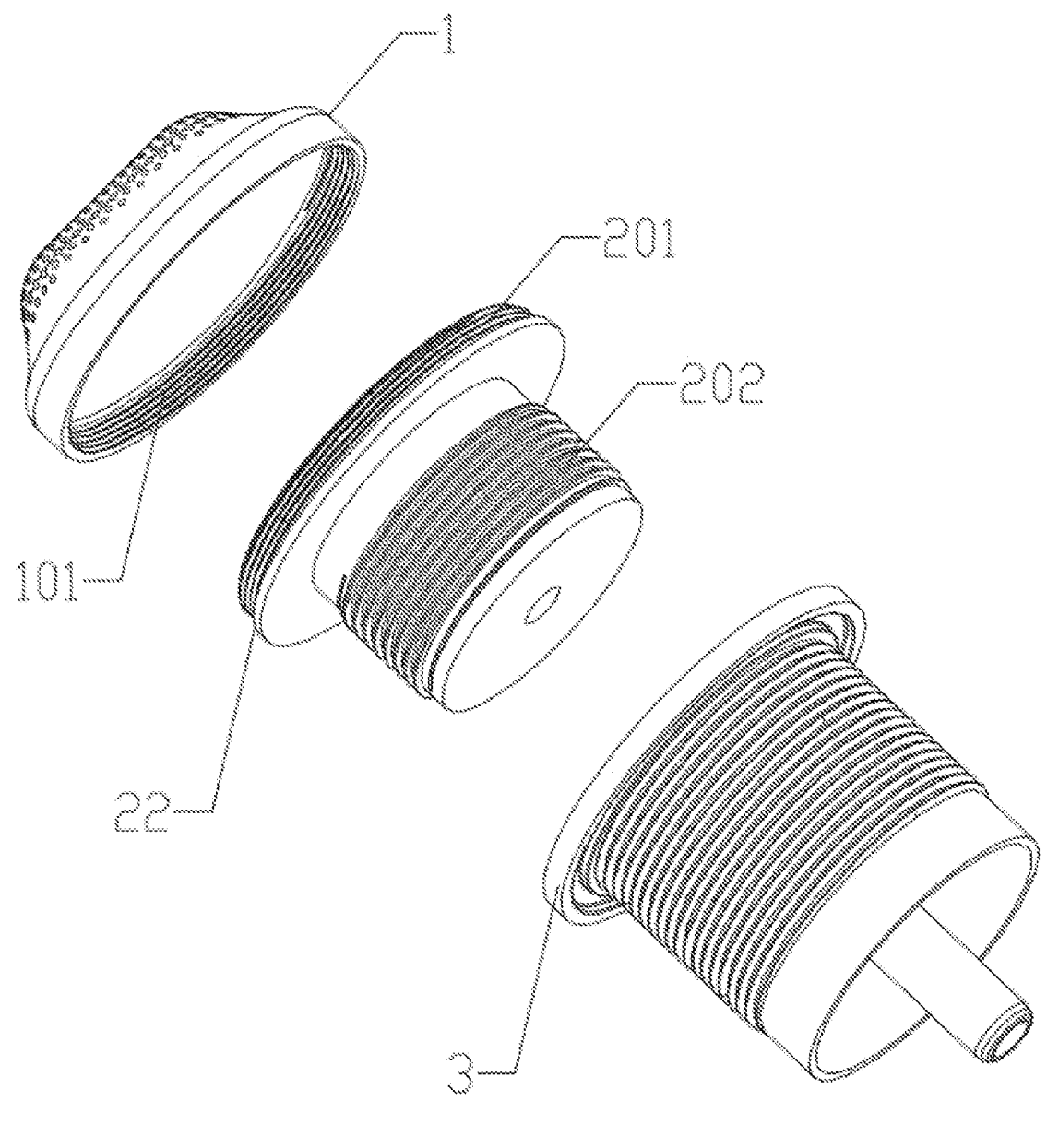
FIG. 2A shows a modular disassembled view of the sodium hypochlorite generator according to an alternative embodiment.

Specifically, referring to FIG. 3 and FIG. 4, the installation relationship of the cover 1 and the electrode insert 2 will be introduced. A flange extends from the insert body 22 of the electrode insert 2 towards the cover 1, a threaded hole 221 is formed in the flange, and the cover 1 is fixedly installed on the insert body 22 with a screw which extends through a counterbore 11 defined in the cover 1 to be engaged in the threaded hole 221. Alternatively, the cover 1 may also be fixedly installed on the insert body 22 through a threaded connection. For example, an external thread 201 (as shown in FIG. 2A) is disposed on the flange, an internal thread 101 is disposed in the cover 1, the cover 1 is fixedly installed on the insert body 22 through a threaded connection. Understandably, the cover 1 may also be fixedly installed on the insert body 22 through a threaded connection or a buckled connection, which will no longer be detailed here.

Figure 2B:
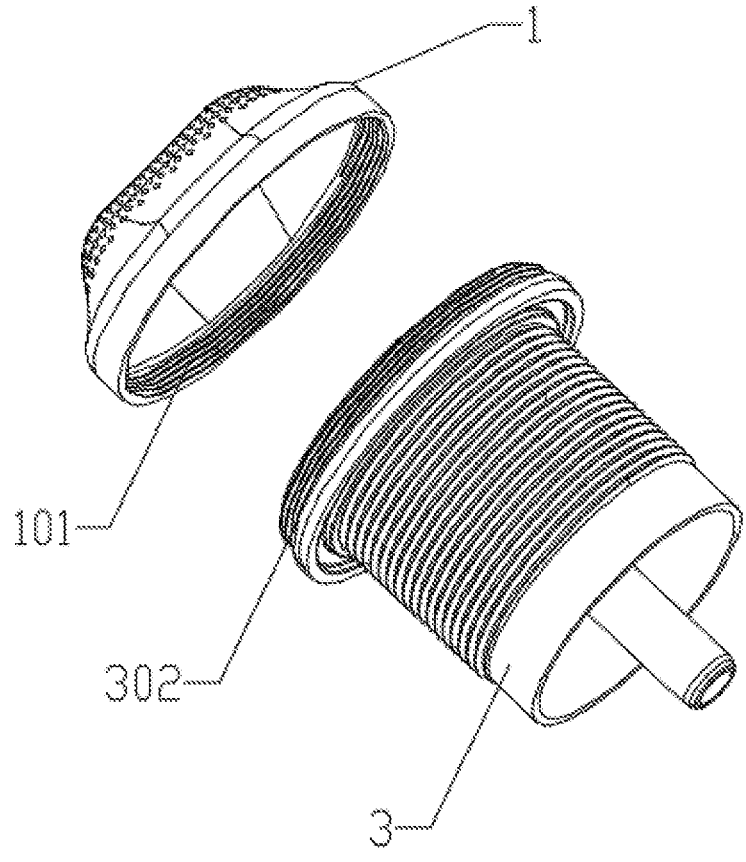
FIG. 2B shows a cover and a base according to a further alternative embodiment.

Understandably, referring to FIG. 2B, the cover 1 not only can be fixedly installed on the electrode insert 2, but also can be fixedly installed to the base 3. Specifically, a flange extends from the base 3 toward the cover 1, an external thread 302 is disposed on the flange, an internal thread 101 is disposed in the cover 1, the cover 1 is fixedly installed on the base 3 through a threaded connection, and in this case, the electrode insert 2 is sealed in a space formed by the cover 1 and the base 3. According to different requirements of different wireless power transmission methods, the connection relationship of the electrode insert 2 and the base 3 may be adjusted flexibly.

Figure 3A:
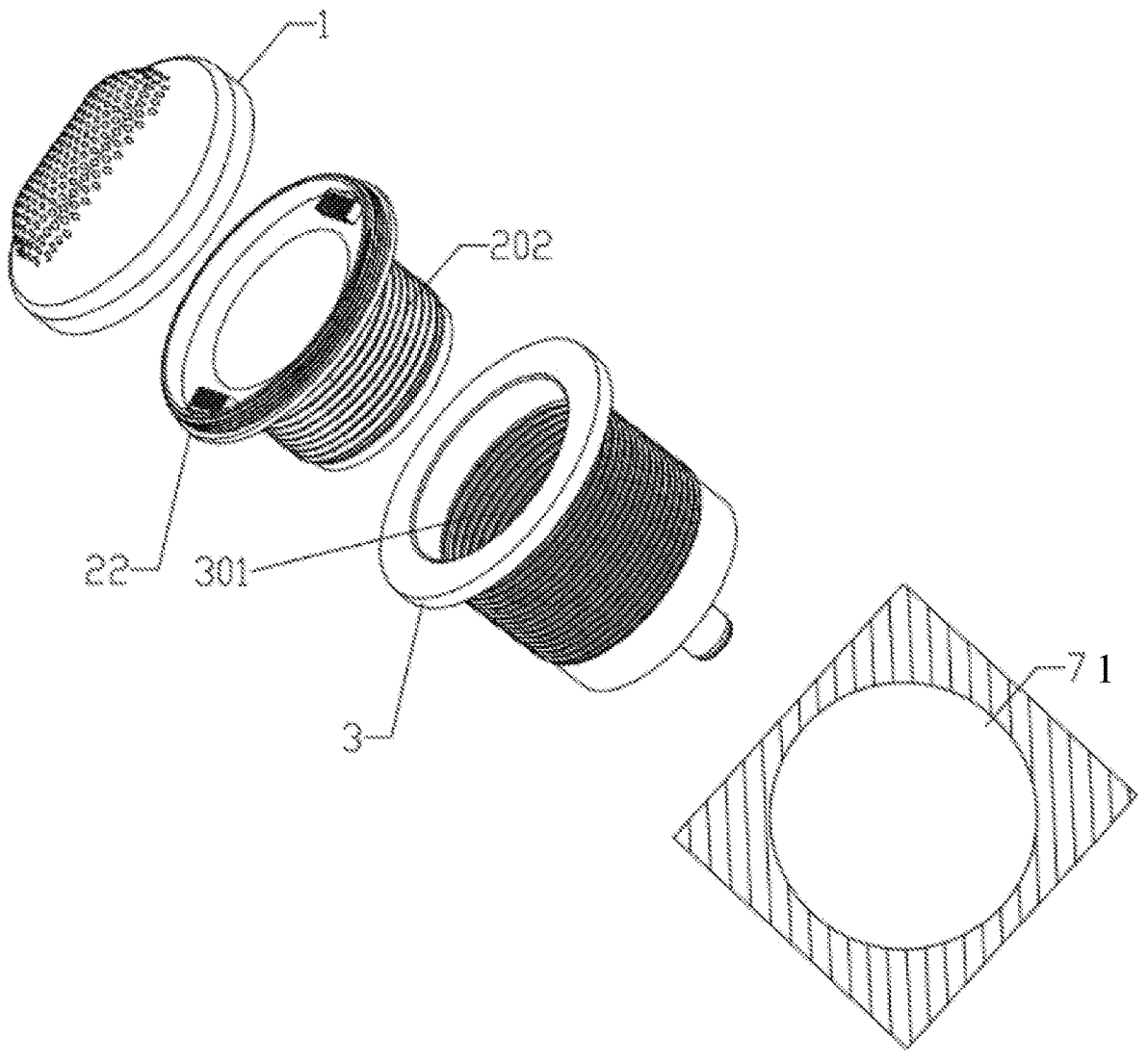
FIG. 3A is similar to FIG. 2A but showing internal threads of the base and a wall hole.

Preferably, a sealing gasket 7 is disposed in an installation gap between the base 3 and the wall hole 71, as shown in FIG. 3 and FIG. 3A.

Finally, referring to FIG. 3, FIG. 4, FIG. 5 and FIG. 7, the installation method of the wireless power receiving device 5 and the wireless power emitting device 6 will be introduced in detail. Wherein, an emitting device accommodating cavity 33 extends from a side, opposite to the insert accommodating cavity 32, of the base 3, an installation slot 34 is formed in the emitting device accommodating cavity 33, the wireless power emitting device 6 comprises a device body and an elastic lug 61 provided on the device body, and the wireless power emitting device 6 is slidably installed in the emitting device accommodating cavity 33 through the elastic lugs 61 inserted into the installation slots 34. Similarly, one or multiple installation slots 225 are formed in the cavity 227 of the cylinder 226 of the insert body 22, the wireless power receiving device 5 comprises a device body and one or multiple elastic lugs 51 provided on the device body, and the wireless power receiving device 5 is slidably installed in the cavity 227 of the cylinder through the elastic lugs 51 inserted into the installation slots 225. The above installation method of the wireless power receiving device and the wireless power emitting device is only one of multiple possible installation methods, and the wireless power receiving device and the wireless power emitting device may also be fixedly installed in the accommodating cavities through buckles, interlocking means, threads or the like, which will no longer be detailed here.

According to the sodium hypochlorite generator provided by the invention, the design of wire-free holes of the electrode insert 2 and the base 3 is realized through wireless power transmission, so that the overall size is reduced, the overall waterproofing and sealing performance of the sodium hypochlorite generator is improved, and the sodium hypochlorite generator is easy to disassemble and maintain; and the electrode insert 2 is independent of the base 3 and can be taken out of water, so that the problem of difficult change of the electrodes underwater is solved.

The above implementations are merely preferred ones of the invention. It should be noted that the above preferred implementations should not be construed as limitations of the invention, and the protection scope of the invention should be subject to the scope defined by the claims. Those ordinarily skilled in the art can make various improvements and embellishments without departing from the spirit and scope of the invention, and all these improvements and embellishments should also fall within the protection scope of the invention.

What is claimed is:

1. A sodium hypochlorite generator, comprising an electrode insert and a base, the electrode insert comprising an insert body and a preset number of electrodes installed on the insert body, wherein a wireless power emitting device is disposed in the base, a wireless power receiving device is disposed in the insert body and is electrically connected to the electrodes so that an external power supply is capable of driving the electrodes to perform electrolysis through the wireless power emitting device and the wireless power receiving device;

wherein the wireless power emitting device comprises an emitting coil, the wireless power receiving device comprises a receiving coil, the emitting coil is symmetrical with the receiving coil, and the wireless power emitting device and the wireless power receiving device perform wireless power transmission through electromagnetic induction;

wherein the wireless power receiving device further comprises a rectification filter module, and the wireless power receiving device is configured to wirelessly receive electric energy from the wireless power emitting device to form AC electric energy, and the rectification filter module is configured to convert the AC electric energy into DC electric energy and output the DC electric energy to the electrodes; and wherein the wireless power receiving device further comprises a polarity reversal circuit and a polarity reversal controller which are connected electrically, two inputs of the polarity reversal circuit are electrically connected to two outputs of the polarity reversal controller respectively, two outputs of the polarity reversal circuit are electrically connected to the electrodes respectively, and the two outputs of the polarity reversal controller are switched regularly to output a high level and a low level respectively to make the polarity reversal circuit to switch polarities of the two outputs regularly, so as to realize regular polarity reversal of the electrodes.

2. The sodium hypochlorite generator according to claim 1, wherein the wireless power emitting device and the wireless power receiving device each comprise a resonator, the resonator of the wireless power emitting device is configured to emit a diffuse field electromagnetic wave, and the resonator of the wireless power receiving device is configured to receive electric energy wirelessly at a frequency matching the diffuse field electromagnetic wave.

3. The sodium hypochlorite generator according to claim 1, wherein the wireless power emitting device comprises an emitting coil, the wireless power receiving device comprises a receiving coil, the emitting coil is configured to vibrate at a predetermined frequency to output a non-radiating magnetic field, the receiving coil has at a natural frequency which is the same as the predetermined frequency of the emitting coil so that the receiving coil can receive energy from the non-radiating magnetic field, and the wireless power emitting device and the wireless power receiving device perform wireless power transmission through electromagnetic coupling resonance.

4. The sodium hypochlorite generator according to claim 1, wherein the wireless power emitting device comprises an electromagnetic wave generator, the wireless power receiving device comprises a receiving antenna, and the wireless power emitting device and the wireless power receiving device perform wireless power transmission through radio waves.

5. The sodium hypochlorite generator according to claim 1, wherein the polarity reversal circuit comprises a first triode, a second triode, a first MOS transistor, a second MOS transistor, a third MOS transistor and a fourth MOS transistor, the first triode is electrically connected to the third MOS transistor and the fourth MOS transistor, the second triode is electrically connected to the first MOS transistor and the second MOS transistor, and the polarity reversal circuit together with the polarity reversal controller sequentially through a current sampling circuit and a constant-current control circuit forms a closed circuit.

6. The sodium hypochlorite generator according to claim 1, wherein the wireless power receiving module further comprises a DCDC voltage stabilizing module electrically connected to the rectification filter module and the electrodes, and the DCDC voltage stabilizing module is configured to increase or decrease a DC voltage output by the rectification filter module to form a constant voltage, which is then output to the electrodes.

7. The sodium hypochlorite generator according to claim 1, wherein the wireless power receiving module further comprises a constant current module electrically connected to the rectification filter module and the DCDC voltage stabilizing module, the constant current module cooperates with a sampling circuit to output a variable voltage to the DCDC voltage stabilizing module through an operational amplifier, and the variable voltage changes an output voltage of the DCDC stabilizing module to keep a current received by the electrode constant.

8. The sodium hypochlorite generator according to claim 1, further comprising a cover, wherein the base is configured to be fixedly installed in a pre-buried wall hole, the electrode insert is detachably inserted into an insert accommodating cavity of the base, the electrodes are communicated with an outside through voids defined through the cover, the wireless power emitting device is disposed outside the base and is close to the insert 18 accommodating cavity, and the wireless power receiving device corresponding to the wireless power emitting device is disposed in the insert body.

9. The sodium hypochlorite generator according to claim 8, A sodium hypochlorite generator, comprising an electrode insert and a base and a cover, the electrode insert comprising an insert body and a preset number of electrodes installed on the insert body;

wherein a wireless power emitting device is disposed in the base, a wireless power receiving device is disposed in the insert body and is electrically connected to the electrodes so that an external power supply is capable of driving the electrodes to perform electrolysis through the wireless power emitting device and the wireless power receiving device;

wherein the base is configured to be fixedly installed in a pre-buried wall hole, the electrode insert is detachably inserted into an insert accommodating cavity of the base, the electrodes are communicated with an outside through voids defined through the cover, the wireless power emitting device is disposed outside the base and is close to the insert accommodating cavity, and the wireless power receiving device corresponding to the wireless power emitting device is disposed in the insert body; and wherein a cylinder extends from an end, close to the base, of the insert body, the wireless power receiving device is accommodated in an interior cavity of the cylinder, installation grooves for installing the electrodes are formed in an opposite end, away from the base, of the insert body, two protrusions are disposed outside the cylinder of the insert body, spiral grooves are formed in the insert accommodating cavity of the base, a clamping portion is disposed at an end of each of the spiral grooves, and the insert body is inserted into the base through cooperation of the protrusions and the spiral grooves and is fixed through cooperation of the protrusions and the clamping portions.

10. The sodium hypochlorite generator according to claim 8, wherein a cylinder extends from an end, close to the base, of the insert body, the wireless power receiving device is accommodated in an interior cavity of the cylinder, installation grooves for installing the electrodes are formed in an opposite end, away from the base, of the insert body, an external thread is disposed outside the cylinder of the insert body, an internal thread is disposed in the insert accommodating cavity of the base, and the insert body is fixedly installed in the base through threaded connection.

11. The sodium hypochlorite generator according to claim 9, wherein an installation slot is formed in the interior cavity of the cylinder, the wireless power receiving device comprises a device body and an elastic lug provided on the device body, and the wireless power receiving device is slidably installed in the interior cavity of the cylinder through the elastic lug being slidably received in the installation slot.

12. The sodium hypochlorite generator according to claim 8, further comprising a turbulent flow passage which penetrates through the base and the insert body to be communicated with a working space of the electrodes.

13. The sodium hypochlorite generator according to claim 8, wherein a flange extends from the electrode insert towards the cover, a threaded hole is defined in the flange, and the cover is fixedly installed on the insert body with a screw.

14. The sodium hypochlorite generator according to claim 8, wherein a flange extends from the insert body towards the cover, an external thread is disposed on the flange, an internal thread is disposed in the cover, and the cover is fixedly installed on the insert body through a threaded connection.

15. The sodium hypochlorite generator according to claim 8, wherein a flange extends from the base towards the cover, an external thread is disposed on the flange, an internal thread is disposed in the cover, and the cover is fixedly installed on the base through a threaded connection.

16. The sodium hypochlorite generator according to claim 8, wherein an external thread is disposed on the base, and the base is configured to be fixedly installed in the pre-buried wall hole through a locking nut.

17. A sodium hypochlorite generator, comprising an electrode insert, a base and a cover, the electrode insert comprising an insert body and a preset number of electrodes installed on the insert body, wherein a wireless power emitting device is disposed in the base, a wireless power receiving device is disposed in the insert body and is electrically connected to the electrodes so that an external power supply is capable of driving the electrodes to perform electrolysis through the wireless power emitting device and the wireless power receiving device;

wherein the base is configured to be fixedly installed in a pre-buried wall hole, the electrode insert is detachably inserted into an insert accommodating cavity of the base, the electrodes are communicated with an outside through voids defined through the cover, the wireless power emitting device is disposed outside the base and is close to the insert accommodating cavity, and the wireless power receiving device corresponding to the wireless power emitting device is disposed in the insert body; and wherein an emitting device accommodating cavity extends from a side, opposite to the insert accommodating cavity, of the base, an installation slot is formed in the emitting device accommodating cavity, the wireless power emitting device comprises a device body and an elastic lug installed on the device body, and the wireless power emitting device is slidably installed in the emitting device accommodating cavity through the elastic lug being slidably received in the installation slot.

* * * * *